117717

PATENTED AUG 8 1871

Wm. R. Anderson's Improvements in Peg Heads.

Witnesses
Geo. W. Goss
Thos B. Van Hill

Inventor
John R. Anderson
by J. B. Taft
his atty.

UNITED STATES PATENT OFFICE.

JOHN R. ANDERSON, OF BROOKLYN, NEW YORK.

IMPROVEMENT IN FOG-HORNS.

Specification forming part of Letters Patent No. 117,717, dated August 8, 1871.

*To all whom it may concern:*

Be it known that I, JOHN R. ANDERSON, of the city of Brooklyn, in the county of Kings and State of New York, have invented an Improvement in the Construction of Fog-Horns, of which the following is a specification:

My present improvement is a further improvement upon the fog-horn described in Letters Patent issued to me bearing date July 7, 1868, and numbered 79,538; and consists, first, in constructing the reed of two leaves of metal so as to form a compound reed and air-pipe; and secondly, in uniting the two parts in the base in a hollow screw-nut which screws into the trumpet, the apex of which is cut off so as to receive it.

Figure 1:
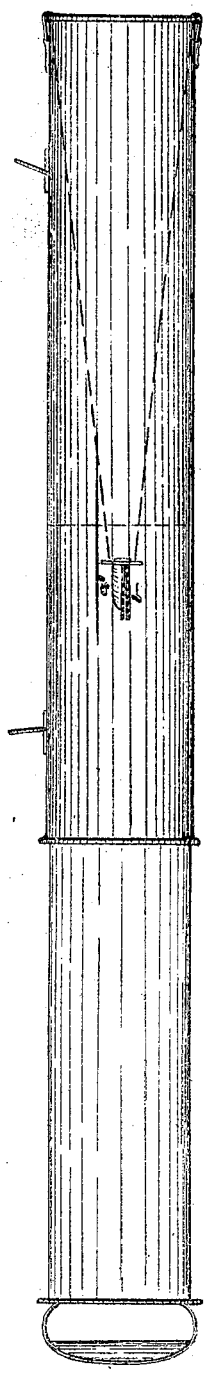
Figure 2:
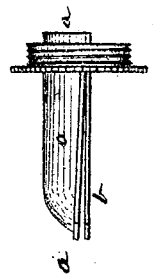

The accompanying drawing represents my improvement, Figure 1 being a side elevation of the fog-horn complete, the particular improvement being represented in its place by dotted lines. Fig. 2 is a side view of the improved parts detached.

The fog-horn to which my present improvement applies consists of a hollow cylindrical tube and a trumpet arranged within the tube or cylinder, as set forth and described in my aforesaid Letters Patent, to which reference is made for a particular description thereof.

In the construction of my present improvement the reed *a* is made out of two plates of steel, or of German silver, or brass, the latter being preferable on account of its being cheaper and from its insuring a deeper sound, and it is readily shaped for use by means of dies. The under leaf *a'* of the reed, which, in fact, constitutes the air-pipe, is shaped and struck out in a die suitable to the form required, similar to that shown in the drawing, Fig. 2. The other or upper leaf *b* is hammered to the required flexibility by hand. These two parts are then united at their base, and then inserted firmly by soldering in a hollow screw-nut. This screw-nut is made to fit into a female screw in the truncated portion of the trumpet, which is cut off at a suitable part of the apex to receive the screw-nut with the reed attached.

The reed and air-pipe are thus made so as to be readily taken off from the trumpet and replaced. The leaf constituting the reed proper is firmly secured at its base, and I have found that this arrangement enables me to make the reed-leaf much shorter than is required when the reed is fastened upon the side of the trumpet by solder, as shown in my former Letters Patent. Under the former arrangement the reed, having to be much longer than under my present improved construction, was liable to derangement and injury from the severe pressure of the air, and, its vibrations being very great, this not only tended to injure the reed but affected the sound of the trumpet, rendering it less pure in tone, and not so loud and distinct as in the present improved construction.

Having thus described my improvement, what I claim therein as my invention, and which I desire to secure by Letters Patent, is—

1. The combination of the curved and plain leaves *a* and *b*, whereby a compound double reed and air-pipe is provided, substantially as and for the purposes described.

2. The compound reed and air-pipe, in combination with the hollow screw-nut, substantially as set forth.

3. The combination of the compound reed and air-pipe, hollow screw-nut, and conical trumpet, substantially as set forth.

JOHN R. ANDERSON.

Witnesses:
J. B. STAPLES,
GEORGE W. FOX.